(12) United States Patent
Gaben et al.

(10) Patent No.: US 9,660,252 B2
(45) Date of Patent: May 23, 2017

(54) METHOD FOR THE PRODUCTION OF ELECTRODES FOR FULLY SOLID BATTERIES

(71) Applicant: I-TEN, Champagne-au-Mont-d'Or (FR)

(72) Inventors: Fabien Gaben, Ecully (FR); Frédéric Bouyer, Perrigny les Dijon (FR); Bruno Vuillemin, Darbonnay (FR)

(73) Assignee: I-TEN, Champagne-au-Mont-d'Or (FR)

( * ) Notice: Subject to any disclaimer, the term of this patent is extended or adjusted under 35 U.S.C. 154(b) by 222 days.

(21) Appl. No.: 14/355,182

(22) PCT Filed: Oct. 30, 2012

(86) PCT No.: PCT/FR2012/052498
§ 371 (c)(1),
(2) Date: Aug. 27, 2014

(87) PCT Pub. No.: WO2013/064773
PCT Pub. Date: May 10, 2013

(65) Prior Publication Data
US 2015/0104713 A1    Apr. 16, 2015

(30) Foreign Application Priority Data

Nov. 2, 2011 (FR) .................................. 11 59896

(51) Int. Cl.
*H01M 4/02* (2006.01)
*H01M 4/13* (2010.01)
(Continued)

(52) U.S. Cl.
CPC ....... H01M 4/0457 (2013.01); H01M 4/0402 (2013.01); H01M 4/0404 (2013.01);
(Continued)

(58) Field of Classification Search
CPC .... H01M 4/04; H01M 4/0404; H01M 4/0471; H01M 4/043; H01M 2010/0495
See application file for complete search history.

(56) References Cited

U.S. PATENT DOCUMENTS 5,846,664 A * 12/1998 Third .................... B22F 3/1003
                                                   419/2
6,242,132 B1 * 6/2001 Neudecker .............. C03C 3/045
                                                  429/218.1

(Continued)

FOREIGN PATENT DOCUMENTS

SU            498666 A1    1/1976

*Primary Examiner* — Patrick Ryan
*Assistant Examiner* — Julian Anthony
(74) *Attorney, Agent, or Firm* — Jordan IP Law, LLC; Todd A. Vaughn

(57) ABSTRACT

The invention relates to a process for fabrication of an electrode film in an all-solid-state battery comprising successive steps to:
   a) Procure a substrate, preferably a conducting substrate,
   b) Deposit an electrode film on said substrate by electrophoresis, from a suspension containing particles of electrode materials,
   c) Dry the film obtained in the previous step,
   d) Thermal consolidation of the electrode film obtained in the previous step by sintering, sintering being done at a temperature $T_R$ that preferably does not exceed 0.7 times the melting temperature (expressed in ° C.), even more preferably does not exceed 0.5 times the melting temperature (expressed in ° C.), and much more preferably does not exceed 0.3 times the melting temperature (expressed in ° C.) of the electrode material that melts at the lowest temperature.

19 Claims, 9 Drawing Sheets

(51) Int. Cl.
  *H01M 4/58* (2010.01)
  *H01M 4/04* (2006.01)
  *H01M 4/1391* (2010.01)
  *H01M 4/485* (2010.01)
  *H01M 10/0525* (2010.01)
  *H01M 10/0585* (2010.01)
  *H01M 4/505* (2010.01)
  *H01M 4/525* (2010.01)

(52) U.S. Cl.
  CPC ....... *H01M 4/0471* (2013.01); *H01M 4/1391* (2013.01); *H01M 4/485* (2013.01); *H01M 4/5825* (2013.01); *H01M 10/0525* (2013.01); *H01M 10/0585* (2013.01); *H01M 4/043* (2013.01); *H01M 4/0435* (2013.01); *H01M 4/505* (2013.01); *H01M 4/525* (2013.01); *H01M 4/58* (2013.01); *Y02P 70/54* (2015.11)

(56) References Cited

U.S. PATENT DOCUMENTS

| | | | |
|---|---|---|---|
| 6,607,645 | B1 | 8/2003 | Sarkar |
| 7,828,619 | B1* | 11/2010 | Yeh ........................ B82Y 30/00 |
| | | | 445/49 |
| 2003/0012952 | A1* | 1/2003 | Yadav .................... A61L 27/06 |
| | | | 428/402 |
| 2007/0048611 | A1 | 3/2007 | Yamamoto |
| 2007/0184345 | A1 | 8/2007 | Neudecker |
| 2009/0053589 | A1 | 2/2009 | Obrovac |
| 2011/0027656 | A1* | 2/2011 | Chiang ................. G02F 1/1523 |
| | | | 429/246 |
| 2011/0104571 | A1* | 5/2011 | Zhamu .................. H01B 1/122 |
| | | | 429/231.95 |
| 2011/0123866 | A1* | 5/2011 | Pan ........................ H01M 2/16 |
| | | | 429/221 |
| 2012/0202120 | A1* | 8/2012 | Kim ....................... B82Y 30/00 |
| | | | 429/231.1 |
| 2013/0244102 | A1* | 9/2013 | Golodnitsky ....... H01M 2/0202 |
| | | | 429/210 |

* cited by examiner

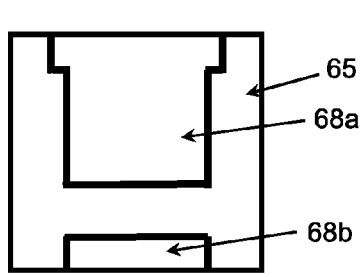

Figure 6a

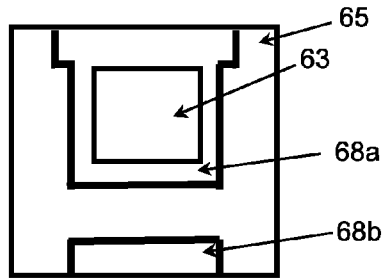

Figure 6b

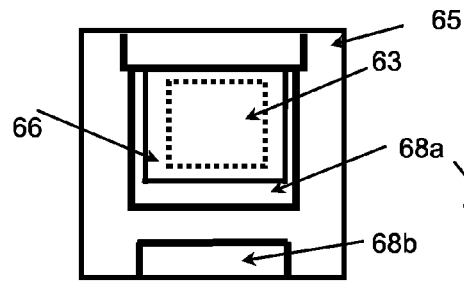

Figure 6c

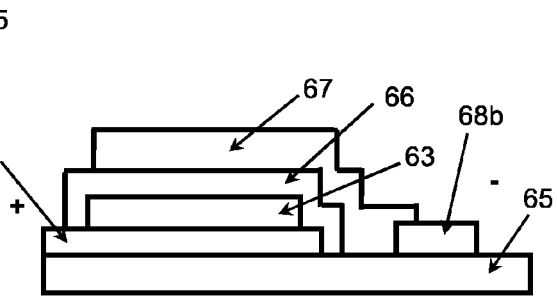

Figure 6d

| Make a colloidal suspension of materials to be deposited |
|---|

↓

| Bring the surface to be coated into contact with the colloidal suspension |
|---|

↓

| Apply an electric field between the surface to be coated and a counter electrode also located in the colloidal suspension for the time necessary to achieve the required deposited quantity |
|---|

↓

| Dry the coating |
|---|

↓

| Sinter and/or consolidate the coating |
|---|

Figure 7

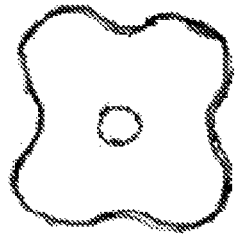
Figure 12b
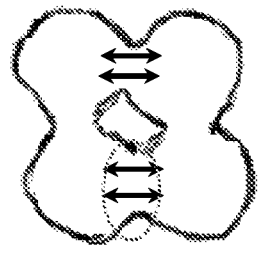
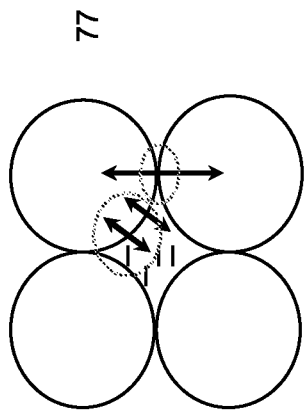
Figure 12a
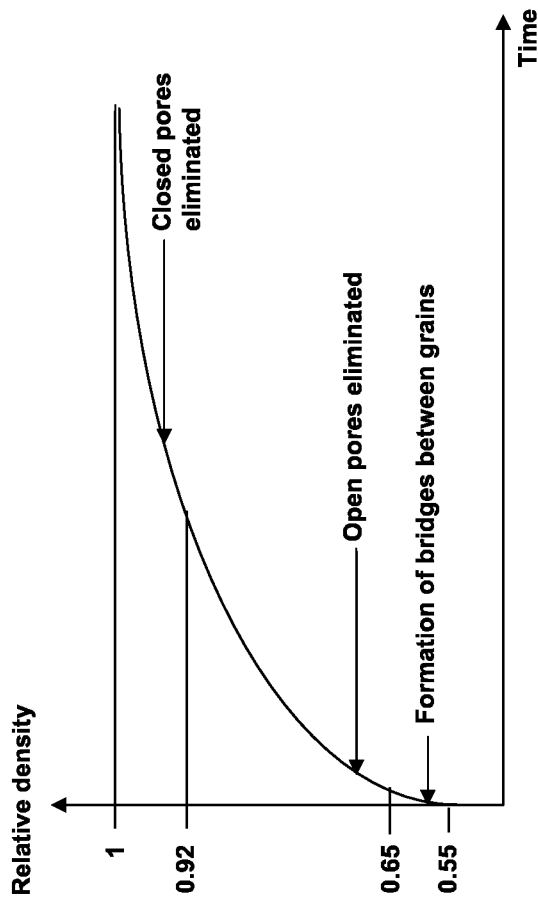
Figure 12d
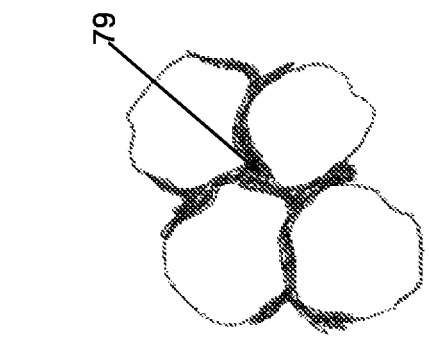
Figure 12c

METHOD FOR THE PRODUCTION OF ELECTRODES FOR FULLY SOLID BATTERIES

FIELD OF THE INVENTION

This invention relates to the field of batteries and particularly lithium ion batteries. It more particularly concerns electrodes of all-solid-state lithium ion batteries and a new process for making such battery electrodes.

STATE OF THE ART

The ideal battery for supplying power to standalone electrical devices (such as telephones and laptop computers, portable tools, standalone sensors) or for traction of electrical vehicles would have a long life, would be capable of storing large quantities of energy and power, and would not exhibit any risk of overheating or explosion.

At the present time, these electrical devices are powered essentially by lithium ion batteries (herein called "Li-ion" batteries) that have the best energy density among the various disclosed storage technologies. However, Li-ion batteries can be made using different architectures and with different chemical compositions of electrodes.

Processes for making Li-ion batteries are presented in many articles and patents and the "Advances in Lithium-Ion Batteries" book (published by W. van Schalkwijk and B. Scrosati) in 2002 (Kluever Academic/Plenum Publishers) gives a good inventory of these processes.

Li-ion battery electrodes can be made using coating techniques (particularly roll coating, doctor blade, tape casting). With these processes, active materials used to make electrodes are in the form of powders with an average size of between 5 and 15 µm diameter. These particles are integrated into an ink that is composed of these particles and deposited on the surface of a substrate.

These techniques can be used to make deposits between 50 and 400 µm thick. The power and energy of the battery can be modulated, by varying the thickness of the deposits and their porosity and the size of active particles.

Inks (or pastes) deposited to form electrodes contain particles of active materials and also binders (organic), carbon powder to make the electrical contact between particles, and solvents that are evaporated during the electrode drying step. A calendering step is performed on the electrodes to improve the quality of electrical contacts between particles and to compact the deposits. After this compression step, active particles of the electrodes occupy about 60% of the volume of the deposit, which means that there is usually 40% porosity between particles.

The contact between each particle is essentially a point contact and the electrode structure is porous. Pores are filled by an electrolyte that may be liquid (aprotic solvent in which a lithium salt is dissolved) or in the form of a more or less polymerized gel impregnated with a lithium salt. Li-ion battery electrodes are usually between 50 and 400 µm thick, and lithium ions are transported through the thickness of the electrode through pores filled with electrolyte (containing lithium salts). The lithium diffusion rate in the thickness of the electrode varies depending on the quantity and size of the pores.

Lithium ions must diffuse both in the thickness of the particle and in the thickness of the electrode (i.e. the coating), to ensure smooth functioning of the battery. Diffusion of active material in the particle is slower than in the electrolyte. Thus, the particle size must be reduced to guarantee good power performances of batteries, and it is between 5 and 15 µm in standard li-ion batteries.

The power and energy of a battery may be varied by varying the thickness of the deposits, and the size and density of active particles contained in the ink. An increase in the energy density is necessarily at the detriment of the power density. High power battery cells necessitate the use of thin very porous electrodes and separators, while on the contrary an increase in the energy density is achieved by increasing these thicknesses and reducing the porosity. The article "*Optimization of Porosity and Thickness of a Battery Electrode by Means of a Reaction-Zone Model*" by John Newman, published in J. Electrochem. Soc., Vol. 142, No. 1 in Jan. 1995, shows the corresponding effects of electrode thicknesses and their porosity on their discharge rate (power) and energy density.

However, increasing the porosity in electrodes tends to reduce the energy density of the battery. If the energy density of the electrodes is to be increased, the porosity has to be reduced. However, in existing Li-ion batteries, the main means by which lithium ions diffuse in the electrode is through pores filled with electrolyte and located between the active particles. If there are no pores filled with electrolyte, lithium ions are transported from one particle to the next only through contact between particles, and this is essentially a point contact. The resistance to transport of lithium ions is such that the battery cannot function.

Furthermore, in order to function satisfactorily, all the electrode pores must be filled with electrolyte. This is only possible if the pores are open. Furthermore, impregnation of the electrode with electrolyte may become very difficult or even impossible depending on the size of the pores and their tortuosity. When the porosity impregnated with electrolyte reduces, the electrical resistance of the deposit reduces and its ion resistance increases. When the porosity drops below 30% or even 20%, the ion resistance increases strongly because some pores are then likely to close which prevents wetting of the electrode by the electrolyte.

Consequently, when it is required to make electrode films with no porosity to increase the energy density, the thickness of these films should be limited to less than 20 µm, and preferably less than 10 µm to enable fast diffusion of the lithium ions in the solid without any power loss.

However, the existing deposition techniques described above are incapable of precisely controlling the thickness of the deposit. Furthermore, the dry extracts used and the associated ink viscosities make it impossible to reduce the thickness below 20 µm.

Another embodiment of electrode films was disclosed. The objective was to use a vacuum technique to deposit a thin film of electrode materials with lithium insertion. This technique can give dense films with no porosity, and consequently with excellent energy densities and temperature resistance.

The absence of pores means that lithium ions can be transported through the film by diffusion, without the need to use organic polymer-based or solvent-based electrolytes containing lithium salts. Such films can cover the entire electrode including its edges.

Such all-inorganic films confer excellent aging, safety and temperature resistance properties. PVD deposition is the most frequently used technique for fabrication of thin film microbatteries. These applications require films with no porosity and no other isolated defects to guarantee low electrical resistivity and good ion conduction necessary for these devices to work correctly.

The deposition rate obtained with such technologies is of the order of 0.1 µm to 1 µm per hour. PVD deposition techniques can result in very good quality deposits containing almost no isolated defects, and can be used to make deposits at relative low temperatures. However, due to the difference in the evaporation rate between the different elements, it is difficult to deposit complex alloys with such techniques and to control the stoichiometry of the deposit. This technique is perfectly suitable for making thin films, but as soon as an attempt is made to increase the thickness of the deposit (for example thicknesses of more than 5 µm), columnar growth occurs and the deposition time becomes too long to envisage industrial use in the field of thin film microbatteries.

Furthermore, vacuum deposition techniques used to make such films are very expensive and difficult to implement industrially over large areas, with high productivity.

Other technologies currently available for making thin films include embodiments based on consolidation of compact particle deposits. These techniques include the production of deposits by sol-gel processes. This technique consists of depositing a polymeric network on the surface of a substrate, obtained after hydrolysis, polymerization and condensation steps. The sol-gel transition appears during evaporation of the solvent that accelerates reaction processes on the surface. This technique can be used to make compact and very thin deposits. The films thus obtained are of the order of a hundred nanometers thick. These thicknesses are then too small to allow reasonable energy storage in battery applications.

Successive steps should be performed to increase the thickness of the deposit without inducing risks of cracks or crazing occurring. Consequently, this technique creates industrial productivity problems as soon as an attempt is made to increase the thickness of the deposit.

Printing techniques using fluid inks can be used to make thin deposits. However, the fluidity of inks depends on the content of dry extracts, particle sizes and the nature of the solvent and any organic compounds dissolved in this ink. In order to make thin film deposits, the dry extract has to be reduced, and excessively small particle sizes have to be aoided (sizes larger than about a hundred nanometers). On the other hand, this increase in the solvent quantity increases risks of forming cracks, cavities and clusters in the deposit during the drying phases. The deposits then become very difficult to compact. Final compaction of the deposit is obtained by evaporation of the solvent contained in the ink. This drying step is difficult to control because regions with lower densities and locally lower porosity will dry faster than areas with higher densities. Capillary effects induced by these local differences in drying will cause zones with higher densities that are still impregnated to group together. The only way to consolidate these deposits is compaction under very high pressures (with the required pressure increasing as the particle size reduces) and/or sintering at high temperatures close to the melting temperature of the material forming the particles.

Very high temperatures are necessary to consolidate the initially porous structure. Temperature rises are difficult to control if it is required that shrinkage accompanying infilling of these pores in the thickness of the deposit does not lead to cracks. Furthermore, not all substrates resist such temperatures.

Finally, there is another alternative for deposition of materials in thin films in electrochemical devices and particularly in batteries. This is an electrophoretic particle deposition. For example, U.S. Pat. No. 6,887,361 (University of California) discloses a process to form a ceramic porous membrane on an electrochemical device substrate in the solid state. Deposition is made by electrophoresis of a suspension of ceramic particles in isopropylic alcohol followed by drying and sintering. The process is applicable essentially to solid oxide fuel cells (SOFC). The purpose of this patent is not to achieve a pore-free dense film.

Patent applications US 2007/184345, WO 2007/061928, US 2008/286651 and WO 2010/011569 (Infinite Power Solutions) disclose electrochemical devices comprising a cathode deposited by techniques other than vacuum deposition; in particular they disclose deposition of a cathode film by electrophoresis from a micronic sized powder of $LiCoO_2$; however, this film comprises cavities and it must be consolidated by sintering at high temperature close to the melting temperature of the deposited material. Other parts of the battery are obtained by vacuum deposition.

U.S. Pat. No. 7,790,967 (3G Solar Ltd) also discloses the deposition of a nanoporous electrode made of $TiO_2$ by electrophoresis starting from a suspension of $TiO_2$ nanoparticles. The electrode thickness is of the order of 10 µm.

Patent JP 4501247 (DENSO) discloses a process for fabrication of an electrode for a battery in which a film of an active material is formed by electrophoresis. More specifically, this patent discloses a process in which a charge collector is dipped in a solution comprising an active material in a solvent, this process being part of a more general process for fabrication of an electrode for a battery. Electrophoresis of said active material contained in the solution is done by generating an electric potential gradient in this solution, the active material forming a film of active material on the surface of the collector and bonding to said collector surface. Fabrication of cathodes for Li-ion batteries using this process is mentioned. Techniques used to make the anode and the electrolyte are not mentioned. The cathodes obtained in this patent are porous.

PURPOSES OF THE INVENTION

A first purpose of this invention is to make electrode films (anode and/or cathode) for an Li-ion battery, with few defects.

Another purpose of the invention is to fabricate electrode films for Li-ion batteries industrially at large scale over large areas and at lower cost.

Another purpose of the invention is to make films with high geometric precision, with a very small quantity of defects and with high deposition rates that can be used to make electrode films for batteries.

These purposes are achieved by means of a process for fabrication of a thin electrode film (anode or cathode) in an all-solid-state battery comprising successive steps of:
a) Providing a substrate,
b) Depositing an electrode film on said substrate by electrophoresis, from a suspension containing particles of electrode materials,
c) Drying the film obtained in the previous step,
d) Thermally consolidating the electrode film obtained in the previous step by sintering, sintering being done at a temperature $T_R$ that preferably does not exceed 0.7 times the melting temperature (expressed in ° C.), even more preferably does not exceed 0.5 times the melting temperature (expressed in ° C.), and much more preferably does not exceed 0.3 times the melting temperature (expressed in ° C.) of the electrode material that melts at the lowest temperature.

The term "melting temperature" in this case refers to the decomposition temperature for the case of substances for which there is no melting point.

Advantageously, the process for fabricating the electrode also comprises a mechanical compaction step (typically by compression) of the dried film, done before or at the same time as the thermal consolidation step. The combination of an applied pressure and a heat treatment makes thermal consolidation possible at lower temperatures than if it were done alone.

Preferably, the mechanical compaction step is done by application of a compression pressure between 20 and 100 MPa, and preferably between 40 and 60 MPa. However in some embodiments, the applied pressure is greater than 250 MPa, or even greater than 400 MPa.

In some embodiments of the invention, the thermal consolidation and/or mechanical compaction step is done under a vacuum to prevent oxidation of the metal substrate.

Said substrate may be a conducting substrate.

Preferably, the average size $D_{50}$ of particles of electrode material is less than 1 μm, preferably less than 100 nm and even more preferably less than or equal to 30 nm.

Said electrode may be an anode or a cathode.

Preferably, the nanoparticles used for making the electrode thin film, particularly a cathode thin film, are non-exhaustively chosen from one or several of the following materials:

$LiMn_2O_4$, $LiCoO_2$, $LiNiO_2$, $LiMn_{1.5}Ni_{0.5}O_4$, $LiMn_{1.5}Ni_{0.5-x}X_xO_4$ oxides (where x is selected from among Al, Fe, Cr, Co, Rh, Nd, other rare earths and in which 0<x<0.1), $LiFeO_2$, $LiMn_{1/3}Ni_{1/3}Co_{1/3}O_4$;

$LiFePO_4$, $LiMnPO_4$, $LiCoPO_4$, $LiNiPO_4$, $Li_3V_2(PO_4)_3$ phosphates;

all lithium forms of the following chalcogenides: $V_2O_5$, $V_3O_8$, $TiS_2$, $TiO_yS_z$, $WO_yS_z$, $CuS$, $CuS_2$.

These materials can give cathode films with very good properties.

Preferably, the nanoparticles used to make electrode thin films and particularly anode films are non-exhaustively chosen from one or several of the following materials:
 (i) tin oxinitrides (typical formula $SnO_xN_y$);
 (ii) mixed silicon and tin oxinitrides (typical formula $Si_aSn_bO_yN_z$ where a>0, b>0, a+b≤2, 0<y≤4, 0<z≤3) (also called SiTON), and particularly $SiSn_{0.87}O_{1.2}N_{1.72}$; and oxinitrides in the form $Si_aSn_bC_cO_yN_z$ where a>0, b>0, a+b≤2, 0<c−10, 0<y<24, 0<z<17; $Si_aSn_bC_cO_yN_zX_n$ and $Si_aSn_bO_yN_zX_n$ where $X_n$ is at least one of the elements F, Cl, Br, I, S, Se, Te, P, As, Sb, Bi, Ge, Pb.
 (iii) $Si_xN_y$ type nitrides (particularly in which x=3 and y=4), $Sn_xN_y$ (particularly in which x=3 and y=4), $Zn_xN_y$ (particularly in which x=3 and y=4), $Li_{3-x}M_xN$ (where M=Co, Ni, Cu);
 (iv) $SnO_2$, $Li_4Ti_5O_{12}$, $SnB_{0.6}P_{0.4}O_{2.9}$ oxides These materials can give anode films with very good properties.

Advantageously, the thickness of the deposited electrode film is less than 20 μm, and preferably less than about 10 μm, and even more preferably less than 5 μm.

In one particular embodiment, the electrical conductivity can be increased by depositing electrical conducting nanoparticles jointly with the electrode materials.

In another embodiment, the ion conductivity of electrodes is increased by depositing nanoparticles of lithium ion conducting materials with melting temperatures lower than the electrode particles, jointly with particles of electrode material. This material that melts at lower temperature will bond the particles to each other, thus assuring continuity of the lithium ion diffusion path. The electrode is all-solid and pores between active particles are filled by this meltable phase.

Some materials that can perform this bonding function include particularly:
 (i) lithium compounds based on lithium and phosphorus oxinitride (called LiPON) in the form $Li_xPO_yN_z$ where x~2.8 and 2y+3z~7.8 and 0.16≤z≤0.4, and in particular $Li_{2.9}PO_{3.3}N_{0.46}$, but also all variants in the form $Li_wPO_xN_yS_z$ where 2x+3y+2z=5=w and 3.2≤x≤3.8, 0.13≤y≤0.4, 0≤z≤0.2, 2.9≤w≤3.3 or in the form $Li_tP_xAl_yO_uN_vS_w$ where 5x+3y=5, 2u+3v+2w=5+t, 2.9≤t≤3.3, 0.94≤x≤0.84, 0.094≤y≤0.26, 3.2≤u≤3.8, 0.13≤v≤0.46, 0≤w≤0.2;
 (ii) lithium compounds based on lithium, phosphorus and silicon oxinitride (called LiSiPON), and particularly $Li_{1.9}Si_{0.28}P_{1.0}O_{1.1}N_{1.0}$;
 (iii) lithium oxinitrides of the LiBON, LiBSO, LiSiPON, LiSON, thio-LiSiCON, LiPONB types (where B, P and S represent boron, phosphorus and sulfur respectively);
 (iv) $La_{0.51}Li_{0.34}Ti_{2.94}$, $Li_{3.4}V_{0.4}Ge_{0.6}O_4$, $Li_2O$—$Nb_2O_5$, $LiAlGaSPO_4$ compounds;
 (v) formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where 0<x<1), $Li_{1+x+y}Al_xTi_{2-x}Si_yP_{3-y}O_{12}$ (where 0≤x≤1 and 0≤y≤1), $Li_{1+x+z}M_x(Ge_{1-y}Ti_y)_{2-x}Si_zP_{3-z}O_{12}$ (where 0≤x≤0.8; 0≤y≤1.0; 0≤z≤0.6), and particularly formulations 4.9LiI-34.1$Li_2O$-61$B_2O_3$, 0,30$Li_2S$-0.26$B_2S_3$.0.44LiI, 60$Li_2S$-40$SiS_2$, 0.02$Li_3PO_4$-0.98($Li_2S$—$SiS_2$), 2($Li_{1.4}Ti_2Si_{0.4}P_{2.6}O_{12}$)—$AlPO_4$, 0.7$Li_2S$-0.3$P_2S_5$.

Making all-inorganic anode and/or cathode electrodes with no added lithium salts or other ionic liquids, in which the transport of lithium ions is facilitated by the addition of such nanoparticles of materials (ceramic and/or vitroceramic particles) conducting lithium ions, can avoid corrosion problems on current collectors, limit the sensitivity of batteries containing such electrodes to temperature and humidity, and improve the life and dependability of these batteries.

In other embodiments, materials containing lithium salts (essentially polymers) can be used for performing this lithium ion conduction. These lithium salts may be LiCl, LiBr, LiI, Li($ClO_4$), Li($BF_4$), Li($PF_6$), Li($AsF_6$), Li($CH_3CO_2$), Li($CF_3SO_3$), Li($CF_3SO_2$)$_2$N, Li($CF_3SO_2$)$_3$, Li($CF_3CO_2$), Li(B($C_6H_5$)$_4$), Li(SCN), Li($NO_3$). Polymer nanoparticles can be polyimides, PVDF, PEO (polyethylene oxide), polymethacrylates, polysiloxanes.

In some embodiments, the zeta potential of suspensions of electrode material particles is more than 40 mV, and preferably more than 60 mV. Such suspensions are very stable and include few particle clusters, so that deposits contain few defects.

In some embodiments, suspensions of electrode material particles may also contain a steric or preferably electrostatic stabilizer. This stabilizer can improve the stability of the suspension, and consequently the quality of the deposited film.

However, suspensions of electrode material not containing a stabilizer are preferred. Dry extracts in stable suspensions without stabilizers are advantageously between 2 and 20 g/L, the particle size preferably being smaller than 100 nm and even more preferably smaller than 50 nm. In this case, the Zeta potential of the suspension is usually less than 40 mV, and more particularly is between 25 and 40 mV.

Another purpose of the invention is to use the process for making batteries, and particularly all-solid-state lithium ion type batteries.

Yet another purpose is an electrode film in an all-solid-state battery, characterized in that it comprises at least one phase composed of active anode or cathode materials, and at least one phase conducting lithium ions and/or conducting electrons, said phases being crystallized with a grain size of between 1 and 100 nm.

DESCRIPTION OF THE FIGURES

FIG. 1(a) diagrammatically shows a compact deposition of particles 2 on a substrate 1. All particles 2 are in contact with their adjacent particles 2a, 2b, 2c, 2d. Pores 3 are located between particles 2. The stack shown in this figure (and in FIGS. 1(b), 1(c) and 1(d)) is deliberately less dense than a compact hexagonal stack, so that pores 3 between particles 2 are more easily visible.

FIG. 1(e) shows a dense deposit 4 as can be obtained using PVD type techniques; the porosity of these dense deposits is close to 0% because they are not formed by stacking particles.

FIGS. 2 to 6 show embodiments of the invention.

FIGS. 6a, 6b, 6c, 6d show products obtained at different steps in another particular embodiment of the process according to the invention, in which the substrate on which the electrodes are deposited is an insulating substrate comprising metalized zones.

Figure 11:
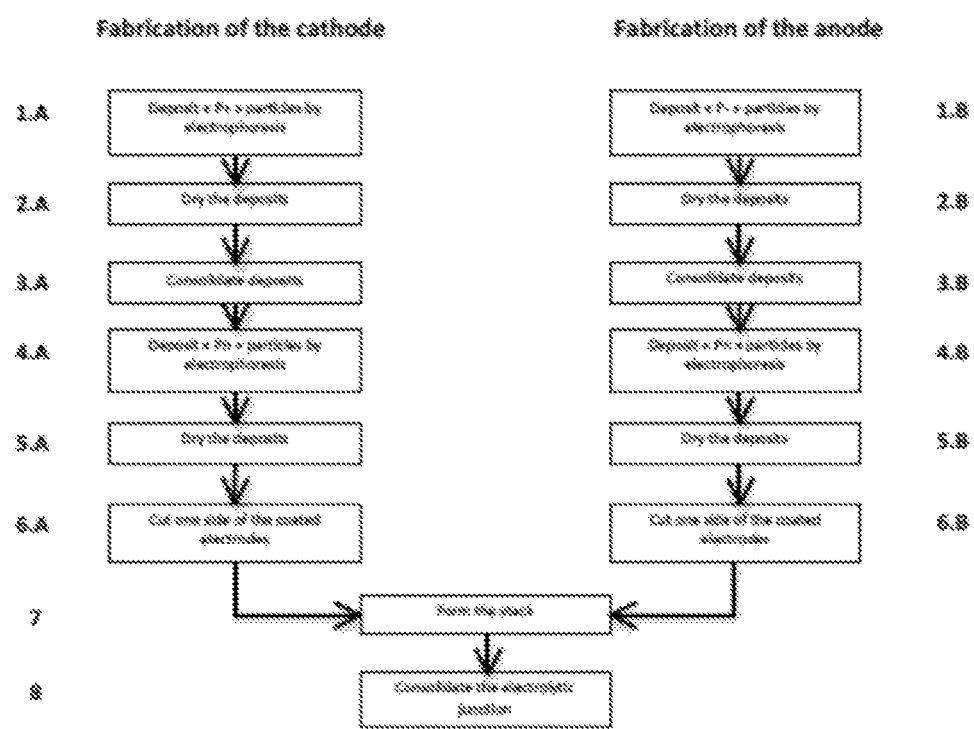

The diagrams in FIGS. 7 and 11 show typical embodiments of the process according to the invention.

Figure 8A:
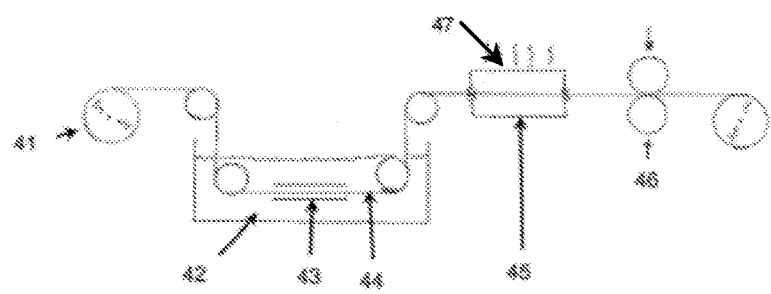
Figure 8B:
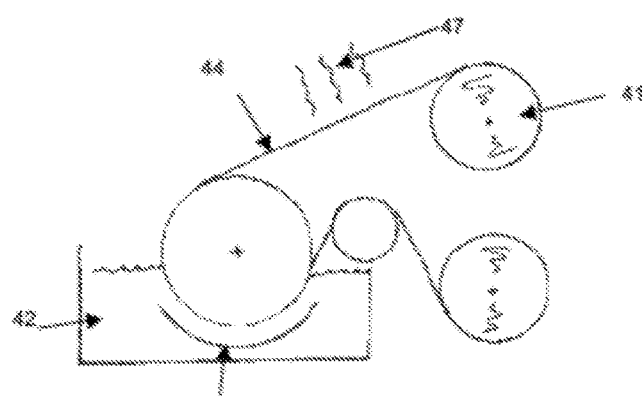

FIGS. 8a and 8b diagrammatically show devices for implementation of the process according to the invention.

Figure 9:
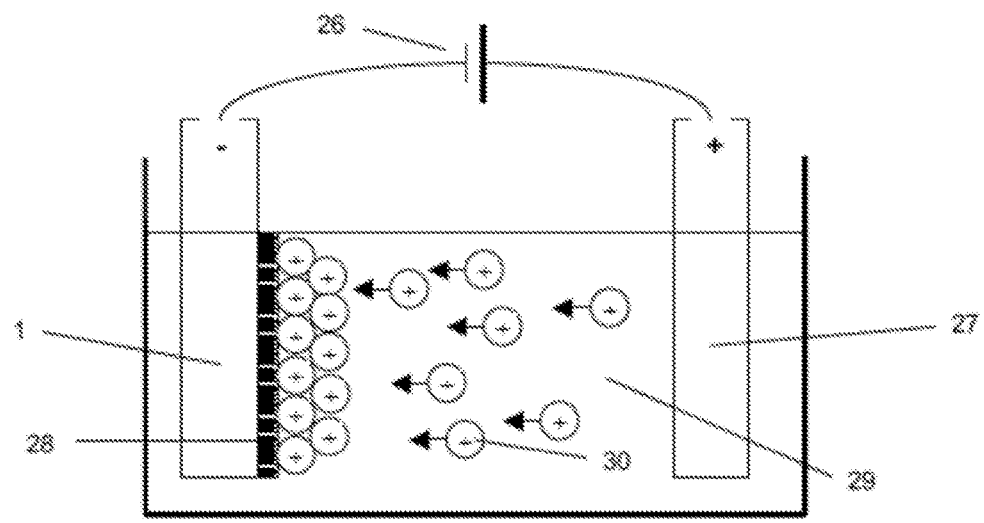

FIG. 9 shows the principle for making a deposition by electrophoresis

Figure 10:
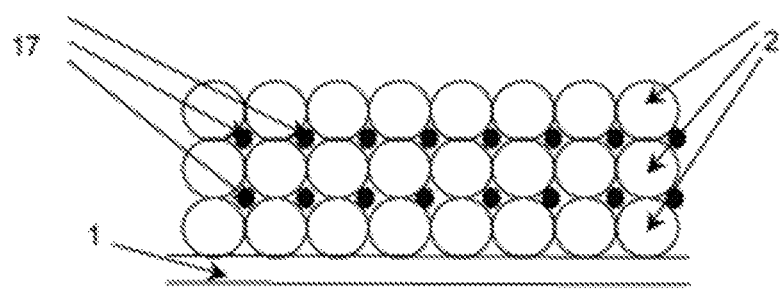

FIG. 10 is a diagrammatic representation of a deposition of two different sizes of nanoparticles.

FIGS. 12a, 12b, 12c show lithium diffusion paths in different particle assembly configurations. FIG. 12d shows the variation of porosity as a function of the density of the deposit.

Figure 13:
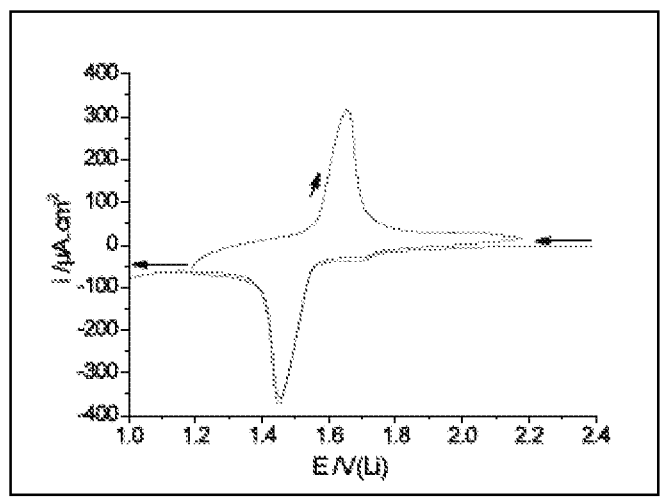

FIG. 13 is a voltammetry curve for a suspension of $Li_4Ti_5O_{12}$ particles with a dry extract of 10 g/L.

| List of references | |
|---|---|
| 1 | Substrate |
| 2, 2a, 2b, 2c, 2d | Particles |
| 3 | Pore |
| 4 | Film obtained by PVD deposition |
| 5 | Cluster |
| 6 | Cavity |
| 7 | Surface breaking crack |
| 8 | Non-surface breaking crack |
| 9 | Stencil |
| 17 | Particles smaller than particles 2 |
| 24 | Cathode |
| 26 | Electrical power supply |
| 27 | Counter electrode |
| 28 | Deposit |
| 29 | Colloidal suspension |
| 30 | Particles |
| 41 | Unwinder |
| 42 | Colloidal suspension |
| 43 | Counter electrode |
| 44 | Substrate (foil) |
| 45 | Drying oven |
| 46 | Mechanical compaction device |
| 47 | Drying the substrate coated with the film deposited by electrophoresis |
| 50 | Substrate edge |
| 60 | Substrate (metalized polymer film) (FIGS. 4a to 4d) |
| 61, 61a, 61b | Polymer film |
| 62 | Substrate 60 or "sandwich" 70 metal film |
| 63 | Cathode film |
| 64a, 64b | Stencil |
| 65 | Insulating substrate |
| 66 | Electrolyte film |
| 67 | Anode film |
| 68a, 68b | Metal films on insulating substrate 65 |
| 70 | Metal film coated with photosensitive resin on its two faces (FIGS. 5a to 5f) |
| 76 | Surface contact zone between particles and the electrolyte contained in pores (low resistance diffusion path) |
| 77 | Point contact zone between particles (diffusion of lithium being limited on this point contact) |
| 78 | Welding of particles during consolidation that led to the development of diffusion paths in the solid, for transport of electrical charges (electrons and ions) |
| 79 | Meltable phase that consolidated the particles to each other |

DETAILED DESCRIPTION OF THE INVENTION

For the purposes of this invention, "electrophoretic deposition" or "deposition by electrophoresis" refers to a film deposited by a process for deposition of particles electrically charged on the surface, previously put into suspension in a liquid medium onto a substrate, displacement of particles towards the surface of the substrate being generated by application of an electric field between two electrodes placed in the suspension, one of the electrodes forming the conducting substrate on which the deposit is made, the other electrode (counter electrode) being placed in the liquid phase. A compact deposit of particles thus forms on the substrate if the zeta potential has an appropriate value as will be explained below.

In the context of this document, the particle size refers to its largest dimension. Thus, a "nanoparticle" is a particle for which at least one of its dimensions is smaller than 100 nm. The "particle size" or "average particle size" of a powder or a set of particles is given by $D_{50}$.

The "zeta potential" of a suspension is defined as being the difference in potential between the heart of the solution and the shear plane of the particle. It is representative of the stability of a suspension. The shear plane (or hydrodynamic radius) corresponds to an imaginary sphere around the particle in which the solvent moves with the particle when the particles move in the solution. The theoretical basis and the determination of the zeta potential are known to the electrochemist who develops depositions by electrophoresis; it can be deduced from the electrophoretic mobility. There are several marketed techniques and devices for making a direct measurement of the zeta potential. When the dry extract is small, the zeta potential can be measured using a Zetasizer Nano ZS type equipment made by the Malvern Company. This equipment uses optical devices to measure particle displacement speeds as a function of the electric field applied to them. The solution also has to be highly diluted to enable the passage of light. When the quantity of dry extract is large, the zeta potential can be measured using acoustophoresis techniques, for example using a device called "acoustosizer" made by the Colloidal Dynamics Company. The particle speed is then measured by acoustic techniques.

"Dispersant" refers to a compound capable of stabilizing the colloidal suspension and particularly preventing particles from agglomerating.

"Sintering" means a process that changes a system composed of individual particles (or a porous agglomerate) by heat treatment without any applied external pressure or under the effect of such a pressure, such that at least some of the system properties (if not all of them) are modified, resulting in reducing the global free energy of the system. At the same time, this change leads to a large (if not complete) reduction of the initial porosity. Finally, the process assumes that there is at least one solid phase at all times throughout the heat treatment, so as to maintain some stability of the shape and dimension of the system considered.

The process according to the invention comprises the essential step of electrophoretic deposition of particles of anode and/or cathode materials. Such a process can significantly reduce the quantity of defects in films obtained in comparison with quantities obtained with known processes, particularly large pores, cavities, crazing and clusters; the quality of deposited films is better when the suspension from which the deposition is made is sufficiently stable.

The process according to the invention can be used for the deposition of electrode films. The thickness of these films is usually less than about 20 µm, preferably less than about 10 µm, and even more preferably less than 5 µm.

The process for fabrication of all-solid-state thin film batteries according to this invention has an advantageous alternative to known techniques and particularly to PVD deposition techniques, in that it can be used to make very dense depositions at low temperature on large substrate areas with high deposition rates, easily and very precisely controllable thicknesses (depending on the size of the particles) over a wide thickness range varying from a tenth of a micron to several tens or even hundreds of microns without requiring very expensive investment in complex and not very productive machines.

Figure 1:
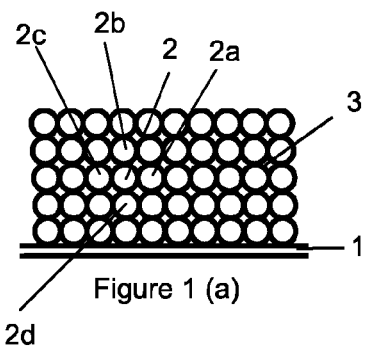
FIGS. 1(a), (b), (c) and (d) diagrammatically show films formed by stacking approximately isotropic shaped particles.
FIG. 1(e) shows a film deposited on a substrate using the PVD technique.
FIG. 1(b) diagrammatically shows a compact deposition of particles 2 as can be obtained using the process according to the invention.
FIG. 1(c) shows a deposit of particles 2 on a substrate, the deposit having defects. These defects are essentially cavities 6 related to the presence of clusters 5; therefore these cavities 6 form inter-cluster pores, unlike the intra-cluster pores 3 that are at a much smaller geometric scale. In the case of a deposition using the process according to the invention, these clusters 5 are formed when the suspension used is not sufficiently stable.
FIG. 1(d) shows a deposit of particles with cracks that appeared after drying; these cracks may be open (surface breaking) cracks 7 or internal (non-surface breaking) cracks 8.
Figure 1:
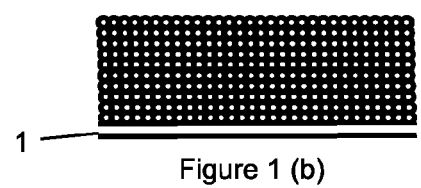
Figure 1:
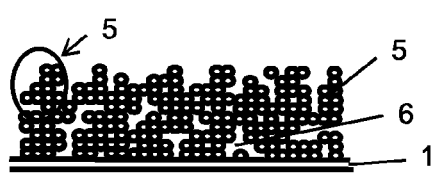
Figure 1:
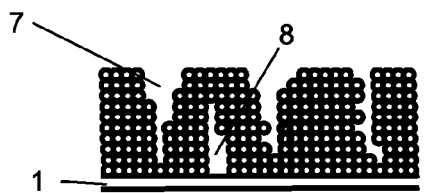
Figure 1:
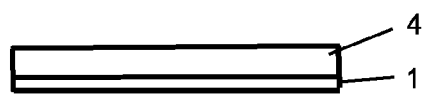

FIGS. 1a to 1c show the differences between intra-cluster pores 3 between particles 2 that will be referred to in this document as "pores", and inter-cluster pores 6 between clusters 5 and that will be referred to as "cavities" 6.

A compact deposit is a deposit without any cavities or cracks. On the other hand, it does have porosity with a ratio expressed as a percentage and calculated as follows:

$$\text{Porosity[\%]}=[(\text{density of the solid-state material}-\text{real density})/\text{real density}]\times 100$$

knowing that the "real density" is the density measured on the deposited film and the density of the solid-state material is the solid density of the deposited material, ignoring the presence of particles that create porosity when stacked.

The following describes each step in the process according to the invention.

Preparation of Suspensions

Deposition is preferably done from very stable SP+ or SP− colloidal suspensions so as to obtain a deposit with a perfectly uniform thickness with no roughness, few defects and as compact as possible after the electrophoretic deposition process. The stability of suspensions depends on the size of the P+, P− particles and the nature of the solvent used and the stabilizer that was used to stabilize the colloidal suspension.

"SP+" refers to a colloidal suspension containing "P+" particles of materials used to obtain a cathode film, "SP−" refers to a colloidal suspension containing P− particles used to obtain an anode film.

Colloidal suspensions containing nanometric sized particles are preferred to facilitate subsequent consolidation of the deposit if necessary and to assure that thin film deposits can be made with very precise thicknesses and profiles (roughness). The average size $D_{50}$ of these particles is preferably less than 100 nm, and more preferably (especially in the case in which the suspension comprises particles of materials with high melting points) less than 30 nm. Consolidation of a deposit with small particles is very much facilitated if the deposit is compact.

Making electrophoretic depositions from stable colloidal suspensions avoids the formation of pores, cavities and clusters that are prejudicial to consolidation of the deposit. Furthermore with this technique, it is possible to have deposits with excellent compactness without necessarily making use of mechanical pressing, regardless of the size of the deposited particles.

The stability of suspensions can be expressed by their zeta potential. In the context of this invention, the suspension is considered to be stable when its zeta potential is more than 40 mV, and very stable when it is more than 60 mV. On the other hand, particle clusters can develop when the zeta potential is less than 20 mV. Thus, in some embodiments, depositions are done from colloidal suspensions with a zeta potential of more than 40 mV, and even more preferably 60 mV (absolute value) to guarantee good compaction of the thin film. However, in other preferred embodiments of this invention, the suspensions have small quantities of dry extracts of particles and the zeta potential is less than 40 mV, as is described in more detail below.

Colloidal suspensions that will be used in electrophoresis comprise an electric insulating solvent that may be an organic solvent, or demineralized water, or a mix of solvents, and particles to be deposited; colloidal suspensions may also comprise one or several stabilizers.

In a stable suspension, the particles do not agglomerate with each other to create clusters that could induce cavities, clusters and/or important defects in the deposit. Particles remain isolated in the suspension.

Also in one embodiment of this invention, the stability of the suspension necessary to obtain a compact deposit is obtained through the addition of stabilizers.

The stabilizer avoids flocculation of powders and the formation of clusters. It can act electrostatically or sterically. Electrostatic stabilization is based on electrostatic interactions between charges and is obtained by the distribution of charged species (ions) in the solution. Electrostatic stabilization is controlled by the surface charge of particles; consequently, it may depend on the pH. Steric stabilization uses non-ionic surfactant polymers or even proteins which, when added to the suspension, are absorbed at the surface of particles to cause repulsion by congestion of the inter-particle space. A combination of the two stabilization mechanisms is also possible. Electrostatic stabilization is preferred for the purposes of this invention because it is easy to implement, reversible, inexpensive and facilitates subsequent consolidation processes.

However, the inventors have observed that with nanoparticles of the electrode materials used for this invention, stable colloidal suspensions of particles that do not agglomerate among themselves and/or of clusters of a few particles can be obtained, without any addition of stabilizers. Particles and/or clusters are preferably smaller than 100 nm, and even more preferably smaller than 50 nm.

These suspensions were obtained for low quantities of dry extracts between 2 g/L and 20 g/L, preferably between 3 and 10 g/L, and more particularly for dry extracts of the order of 4 g/l, in an alcohol and/or ketone type organic solvent. These stable colloidal suspensions of particles without added stabilizers are especially preferred for this invention.

The Zeta potential of such suspensions is usually less than 40 mV, and more particularly between 25 and 40 mV. This could mean that such suspensions tend to be unstable, however the inventors have observed that the use of these suspensions for an electrophoretic deposition leads to very good quality deposited films.

The addition of stabilizers or cations in such suspensions to modify the surface charge of nanoparticles to make them compatible with cataphoretic polarizations would result in polluting the deposits; even worse, slightly volatile organic stabilizers could result in nanoparticles being electrically isolated thus preventing any electrochemical response.

Deposition voltages of less than 5 V must be preferred when the solvent used is water. At above 5 V, water can be electrolyzed causing gas production on electrodes that make deposits porous and reduce their adherence to the substrate. Galvanic reactions in an aqueous medium also cause the formation of metal cations that can pollute deposits.

In one preferred embodiment, depositions are made in a solvented phase. It is thus possible to work at much higher voltages, thus increasing deposition rates.

According to the invention, nanoparticles used for making the cathode thin film are preferably but not exhaustively chosen from among one or several of the following materials: $LiMn_2O_4$, $LiCoO_2$, $LiNiO_2$, $LiMn_{1.5}Ni_{0.5}O_4$, $LiMn_{1.5}Ni_{0.5-x}X_xO_4$ (X=Al, Fe, Cr, Co, Rh, Nd, other rare earths, and 0<x<0.1), $LiFePO_4$, $LiMnPO_4$, $LiNiPO_4$, $Li_3V_2(PO_4)_3$, $LiCoPO_4$, $LiFeO_2$, $LiMn_{1/3}Ni_{1/3}Co_{1/3}O_4$ and all lithium forms of the following chalcogenides: $V_2O_5$, $V_3O_8$, $TiS_2$, $TiO_yS_z$, $WO_yS_z$, CuS, $CuS_2$.

According to the invention, the nanoparticles used for making the anode thin film are preferably but not exhaustively chosen from among one or several of the following materials:

tin oxinitrides (typical formula $SnO_xN_y$);

mixed silicon and tin oxinitrides (typical formula $Si_aSn_b O_yN_z$ where a>0, b>0, a+b≤2, 0<y≤4, 0<z≤3) (also called SiTON), and particularly $SiSn_{0.87}O_{1.2}N_{1.72}$; and oxinitrides in the form $Si_aSn_bC_cO_yN_z$ where a>0, b>0, a+b≤2, 0<c–10, 0<y<24, 0<z<17; $Si_aSn_bC_cO_yN_zX_n$ and $Si_aSn_bO_yN_zX_n$ where $X_n$ is at least one of the elements F, Cl, Br, I, S, Se, Te, P, As, Sb, Bi, Ge, Pb;

$Si_xN_y$ type nitrides (particularly in which x=3 and y=4), $Sn_xN_y$ (particularly in which x=3 and y=4), $Zn_xN_y$ (particularly in which x=3 and y=4), $Li_{3-x}M_xN$ (where M=Co, Ni, Cu);

$SnO_2$, $Li_4Ti_5O_{12}$, $SnB_{0.6}P_{0.4}O_{2.9}$, oxides.

Furthermore, nanoparticles of electron conducting materials and particularly graphite, and/or lithium ion conducting materials, and particularly materials melting at a lower temperature than the electrode materials, can be added to the materials mentioned above. Some electrode materials are bad ion and electrical conductors, consequently when the deposited thicknesses are greater than 0.5 μm, the electrode may be too resistive and not function any longer. Thicknesses of 1 to 10 μm are usually required for electrodes, so as to have batteries with good energy densities. In this case a co-deposit of electrode material particles and conducting particles (ion and/or electrical) is required.

For example, the following compounds can be added:

lithium compounds based on lithium and phosphorus oxinitride (called LiPON) in the form $Li_xPO_yN_z$ where x~2.8 and 2y+3z~7.8 and 0.16≤z≤0.4, and in particular $Li_{2.9}PO_{3.3}N_{0.46}$, but also all variants in the form $Li_wPO_xN_yS_z$ where 2x+3y+2z=5=w and 3.2≤x≤3.8, 0.13≤y≤0.4, 0≤z≤0.2, 2.9≤w≤3.3 or in the form $Li_tP_xAl_yO_uN_vS_w$ where 5x+3y=5, 2u+3v+2w=5+t, 2.9≤t≤3.3, 0.94≤x≤0.84, 0.094≤y≤0.26, 3.2≤u≤3.8, 0.13≤v≤0.46, 0≤w≤0.2;

lithium compounds based on lithium, phosphorus and silicon oxinitride (called LiSiPON), and particularly $Li_{1.9}Si_{0.28}P_{1.0}O_{1.1}N_{1.0}$;

lithium oxinitrides of the LiBON, LiBSO, LiSiPON, LiSON, thio-LiSiCON, LiPONB types (where B, P and S represent boron, phosphorus and sulfur respectively); $La_{0.51}Li_{0.34}Ti_{2.94}$, $Li_{3.4}V_{0.4}Ge_{0.6}O_4$, $Li_2O—Nb_2O_5$, LiAlGaSPO$_4$ compounds;

formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where 0<x<1), $Li_{1+x+y}Al_xTi_{2-x}Si_yP_{3-y}O_{12}$ (where 0≤x≤1 and 0≤y≤1), $Li_{1+x+z}M_x(Ge_{1-y}Ti_y)_{2-x}Si_zP_{3-z}O_{12}$ (where 0≤x≤0.8; 0≤y≤1.0; 0≤z≤0.6), and particularly formulations 4.9LiI-34,1Li$_2$O-61B$_2$O$_3$, 0,30Li$_2$S-0.26B$_2$S$_3$-0.44LiI, 60Li$_2$S-40SiS$_2$, 0.02Li$_3$PO$_4$-0.98(Li$_2$S—SiS$_2$), 2(Li$_{1.4}$Ti$_2$Si$_{0.4}$P$_{2.6}$O$_{12}$)—AlPO$_4$, 0.7Li$_2$S-0.3P$_2$S$_5$.

The addition of such nanoparticles of inorganic materials (ceramic and/or vitroceramic particles) conducting lithium ions makes it possible to maintain the all-solid and inorganic nature of the electrode. The absence of lithium salts and/or impregnated ionic liquids can reduce corrosion problems on current collectors, that can then both be formed from aluminium, limit the sensitivity of batteries containing such electrodes to temperature and humidity, and improve the life and safety of these batteries in operation.

In other embodiments, materials containing lithium salts (essentially polymers) can be used to conduct lithium ions in electrodes. Lithium salts may be LiCl, LiBr, LiI, Li(ClO$_4$), Li(BF$_4$), Li(PF$_6$), Li(AsF$_6$), Li(CH$_3$CO$_2$), Li(CF$_3$SO$_3$), Li(CF$_3$SO$_2$)$_2$N$_5$, Li(CF$_3$SO$_2$)$_3$, Li(CF$_3$CO$_2$), Li(B(C$_6$H$_5$)$_4$), Li(SCN), Li(NO$_3$). The polymers may be polyimides, PVDF, PEO (polyethylene oxide), polymethacrylates, polysiloxanes.

Once the required target chemical composition, i.e. the nature of the powder or powder mixes, has been defined, the nanoparticles are put into suspension in an appropriate liquid phase. A stabilizer is added in some embodiments, in order to obtain a suspension for which the zeta potential is preferably greater than 40 mV, and even more preferably more than 60 mV.

However, advantageously, the suspensions used do not contain any stabilizers, and particularly have low contents of dry extracts (usually less than 20 g/L), and especially they contain particles smaller than 100 nm and preferably smaller than 50 nm. In this case, the Zeta potential of the suspension is usually between 25 and 40 mV.

For example, the solvents used can be based on ketone, alcohol or a mix of the two.

Steric stabilizers that could be used include particularly polyethylene imine (PEI), polyacrylic acid (PAA), citric acid and nitrocellulose provided that they are soluble in the chosen organic solvent.

Electrostatic stabilizations may be made by adding iodide, by adding acids or bases. The solution may be acidified or basified by the addition of traces of water and acids when the suspension is made in a solvented phase.

The electrical conductivity of the suspension may be controlled to obtain a large potential gradient between the two electrodes without any risk of dielectric breakdown. Preferably, the conductivity of the colloidal suspension is between 1 and 20 µS/cm. Strong acids and bases can be added in small quantities to control the conductivity of the suspension and to charge particle surfaces.

It may be necessary to perform a powder grinding and/or dispersion step before the nanoparticles are put into suspension, to de-agglomerate the particles and possibly adjust their size (to obtain an average size smaller than 100 nm or even less than 30 nm) and reduce the size dispersion, so as to obtain a stable suspension with cluster-free nanometric sized particles. Ultrasounds may also be used to assist in deagglomeration and putting particles into suspension.

Defects created in particles during the grinding and dispersion steps can also reduce the consolidation temperature, in the same way as when mechanical compressions are performed.

Deposition of Films

According to the invention, the electrode film is deposited by electrophoresis. The electrophoretic deposition of particles is made by application of an electric field between the substrate on which the deposit is made and a counter electrode, in order to move the charged particles in the colloidal suspension and to deposit them on the substrate. The lack of binders and other solvents deposited on the surface with the particles can result in very compact deposits. The compactness obtained due to electrophoretic deposition and the lack of any large quantities of organic compounds in the deposit can limit or even prevent risks of crazing or the appearance of other defects in the deposit during drying steps.

Furthermore, due to the fact that the deposit obtained by electrophoresis does not contain any binders or other organic compounds, the process according to this invention does not require any burning or evaporation steps of corrosive or noxious compounds. The increase in economic and environmental constraints makes it necessary to reduce releases into the atmosphere and this invention thus satisfies these constraints.

Furthermore, these debinding steps lead to the appearance of many defects in the electrode deposit.

Furthermore, the deposition rate can be very high depending on the applied electric field and the electrophoretic mobility of particles in suspension. For an applied voltage of 200 V, deposition rates of the order of 10 µm/min can be obtained.

FIG. 9 shows the operating principle of deposition by electrophoresis.

The inventor has observed that this technique can be used to make deposits on very large areas with excellent uniformity (provided that the particle concentrations and electric fields are uniform over the surface of the substrate). It is also suitable for a continuous band process, in other words the substrate is advantageously a band; the band is advantageously stationary relative to the liquid phase during the electrophoretic deposition.

The substrate can be a sheet or a band with a conducting surface. For example, a copper or aluminium foil with a thickness for example of 6 µm or a polymer band with an electrically conducting surface deposition, can be used.

Advantageously, the substrate is a thin aluminium sheet. Aluminium substrates are compatible with anaphoretic deposition processes, unlike some other metals and particularly copper that tends to dissolve in anodic polarization. This surface dissolution of copper bands prevents the creation of a stable bonding base for electrode deposits. The inventors have observed that with nanoparticles of battery materials, it is possible to obtain colloidal suspensions of particles without the addition of stabilizers, but that these nanoparticles are always negatively charged and consequently compatible with anaphoretic depositions.

The thickness of each cathode and anode film is preferably between 5 µm and 20 µm.

A mechanical compaction step (for example by pressing) can be carried out after deposition of the film and its drying, and before the possible sintering step by heat treatment, in order to further compact the particles and induce particle deformations that will further simplify subsequent consolidation.

Deposition by electrophoresis may be applied in a "batch" (static) type process or in a continuous process. FIGS. 8$a$ and 8$b$ show different methods of making electrophoretic depositions, to make thin bands or coatings on a conducting substrate.

During the electrophoretic deposition, a stabilized power supply can be used to apply a voltage between the conducting substrate and two electrodes located on each side of this substrate. This voltage may be direct or alternating. Precise monitoring of the currents obtained helps to monitor the deposited thicknesses and to control them precisely. When the deposited films are insulating, their thickness affects the value of the electric field and in this case, a controlled current deposition mode is preferred. The value of the electric field is modified depending on the resistivity of the interface.

FIG. 8$a$ diagrammatically shows an installation to make use of the process according to the invention. The electrical power supply located between the counter electrodes 43 and the conducting substrate 44 is not shown. An electric field is applied between the two counter electrodes 43 and the substrate 44 to deposit particles of the colloidal suspension 42 on the two faces of the substrate 44.

The reel of electricity conducting foil (band) 44 acting as the substrate is unwound from an unwinder 41. After deposition, the deposited film is dried in a drying oven 45 and is then consolidated by mechanical compaction using an appropriate compaction means 46. Compaction can be done under a controlled atmosphere at temperatures between ambient temperature and the melting temperature of deposited materials.

The view in FIG. 8a is interesting for making deposits of active materials on current collectors used to make battery electrodes. However, it may be sufficient to coat only one face of the substrate. FIG. 8b also shows a device to make a coating on a single conducting face without mechanical compaction.

This deposition technique also enables perfect coverage of the surface regardless of its geometry and the presence of roughness defects.

The lack of mechanical contacts means that deposits can be made on extremely large areas. With known deposition techniques such as roll coat, doctor blade etc., it is difficult to guarantee a perfectly uniform thickness over large substrates, which is why the width of coating lines is often limited. For example, when it is required to make high power Li-ion battery deposits, in other words thin deposits, the maximum band width is about 200 to 300 mm, which strongly limits the production capacity of coating lines according to the state of the art.

When materials that do not conduct electricity or conduct electricity only slightly are electrophoretically deposited on the surface of a substrate, any zones that are not so well coated conduct better and thus locally concentrate a higher deposition rate that tends to compensate or even eliminate the defect. The intrinsic quality of the deposits obtained is thus excellent, there are very few defects and the deposits are very homogeneous.

The diagram in FIG. 7 shows a typical embodiment of the process according to the invention:

Step 1: Preparation of suspensions. In a first step, a colloidal suspension is prepared from powders with the required chemical composition of the coating (the thin film).

Step 2: Bring the surface to be coated and the colloidal suspension into contact, typically by immersion of the metal substrate in the colloidal suspension. The colloidal suspension can cover the entire surface of the substrate. In one particular embodiment, a stencil can be applied to the surface of the substrate so as to limit the area in contact with the suspension, consequently reducing the area of the deposit.

Step 3: Apply an electrical field between the surface to be coated and a counter electrode also located in the colloidal suspension for as long as necessary to obtain the required deposited quantity. This electric field can be constant and/or variable (alternating). The average direction of the electric field, in other words the potential applied to the electrodes, is adapted to the charge of the particle to be deposited.

Step 4: Dry the coating. Drying conditions depend on the deposited thickness and the nature of the solvent.

Step 5: Consolidate the deposit by sintering and/or mechanical compaction.

Consolidation of the Deposit

Advantageously, deposited films are consolidated to minimize cavities, pores, cracks and other compaction defects. This consolidation step of the deposit can be done:

by heat treatment. The temperature depends closely on the chemical composition of the deposited powders. Depending on the chemical composition of the deposited particles, it may also be useful to maintain a controlled atmosphere to prevent oxidation of the coating;

by a combination of thermal and mechanical means, and particularly by high pressure sintering;

In general, it is preferred that the consolidation temperature should not exceed 600° C., and even more preferably should not exceed 500° C. In some embodiments, the temperature is between 180° C. and 400° C.

Consolidation at such temperatures requires that the film obtained at the end of the deposition should be compact with no meso-pores (cracks, cavities) nor aggregates. This is possible with the electrophoretic deposition process as described above. It is also necessary that deposited particles have nanometric sizes as described above and preferably smaller than 50 nm, and even more preferably smaller than 30 nm.

Furthermore, the heat treatment temperature also depends on whether or not a pressure is applied, pressure being applied possibly before, during or after the heat treatment. The heat treatment temperature can be lowered when pressure is applied.

In all cases, the applied pressure is advantageously between 20 and 100 MPa.

However it can be higher if necessary. The applied pressure in some embodiments is more than 250 MPa or even more than 400 MPa.

The substrate of electrode films is preferably composed of a usually metallic electrically conducting material. When the substrate is metallic, it is preferred to avoid heating it to high temperatures during fabrication of the battery, to prevent risk of oxidation and deterioration of surface properties. The reduction in surface oxidation is particularly beneficial to reduce electrical contact resistances, which is an essential point in operation of energy storage and/or production devices.

Very high quality electrophoretic films like those described above and particularly compact films, can reduce the heat treatment duration and temperature and limit shrinkage related to these treatments, to obtain a homogeneous nanocrystalline structure. This contributes to obtaining dense films with no defects.

The inventor has observed that the heat treatment temperature can be reduced if the size of deposited particles is reduced. Thus, thin or relatively thick film deposits can be made with a porosity of less than 5% or even 2% without needing to apply high temperatures and/or long heat treatment times. Furthermore, this compaction technology for low temperature deposits considerably reduces risks of shrinkage. It is also no longer necessary to use highly complex and expensive heat treatment cycles to consolidate deposits of ceramic particles for battery electrode films.

During the thermal consolidation and/or mechanical compaction phase(s), it can be advantageous to work under a vacuum or under an inert atmosphere to prevent the appearance of pollution on particle surfaces that could be harmful to the consolidation mechanism of particles among each other.

For particle sizes like those used in the process according to the invention, the increase in surface energies becomes the main driving force of consolidation by heat treatment; this results in a large reduction in consolidation temperatures when the particle size reduces. However, if this reduction in consolidation temperatures is to be effective, it is necessary for particles to be firstly mechanically compacted and/or deposited with compact stacking. Multiplication of mechanical contacts between these particles facilitates diffusion processes that cause consolidation. Thus, pressing is usually applied to compact deposits.

The presence of clusters and inter-cluster cavities also has an influence on consolidation. As cavity sizes increase, the diffusion distance also increases and the consolidation temperature necessary to obtain good consolidation increases.

Thus, with nanoparticles deposited by electrophoresis, it is possible to approach the theoretical geometric density of a compact stack (74%), without a mechanical compaction step.

Such a result is not possible using inking techniques. Deposition of nanoparticles using the ink technique mentioned above is very difficult for thin films because the reduction in particle size increases the viscosity of suspensions. Thus, the dry extract has to be reduced by increasing the proportion of solvent; in this case, pores and cavities are induced when much of the solvent is eliminated from the raw films, and it is practically impossible to fill them without the use of extreme temperatures and/or pressures.

The high compactness of the deposit obtained by electrophoresis and the small quantity of solvent to be evaporated very significantly reduce the risk of appearance of cracks after drying. Furthermore, the small size of particles and their large specific area tend to facilitate consolidation steps by heat treatment (often called "sintering" in this context). The deposit can thus be consolidated at temperatures less than $0.7T_f$, preferably $0.5T_f$ or even $0.3T_f$ where $T_f$ is the melting temperature (expressed in ° C.) of the solid material with chemical composition identical to that of the deposited particle. When the electrode film is composed of a mix of materials, the heat treatment temperature is chosen relative to the melting temperature of the material with the lowest melting temperature. Mechanical compression can also be applied to this deposit in order to further reduce this consolidation temperature, in order to further increase its compactness and/or create isolated defects that will contribute to accelerating the consolidation process and obtaining thin films with no pores.

Such a process for the fabrication of electrode films can be used directly on substrates such as aluminium foil with low melting temperatures.

However, since nanoparticles are very sensitive to surface pollution, it is preferable to perform these consolidation treatments under a vacuum or under an inert atmosphere.

The process according to the invention can be used in the fabrication of a Li-ion battery.

The fabrication steps are described below with reference to FIG. 11 to illustrate such an embodiment.

A cathode film and an anode film are deposited on a conducting substrate in steps 1.A and 1.B respectively, by electrophoresis. This deposit may be made on both faces of the conducting substrate. The film deposited by electrophoresis is dried in steps 2.A and 2.B. In steps 3.A and 3.B, it is consolidated by mechanical and/or thermal means. This consolidation can result in a density of more than 90% of the theoretical density of the solid body, or even more than 95%.

Deposits with very good initial compactness can be obtained using electrophoretic techniques. Thus, the shrinkage of such a deposit during consolidation by heat treatment is small and therefore there are few or no defects in the films, even if they are made over large areas and thicknesses.

Furthermore, the consolidation step by heat treatment will be done even more easily at low temperatures and during short times if the initial film is compact and particles are small. It is advantageous to use small particles (<30 nm) and/or with parallelepiped shapes in order to further increase compactness before sintering.

The electrolyte film is deposited on the anode and the cathode in steps 4.A and 4.B respectively, using any appropriate means. The thickness of the deposited film may be of the order of 1 μm. This deposit preferably also covers the edges of the electrodes. This insulation of the edges of electrodes prevents the risk of short circuit and also the risk of leakage currents. This electrolyte deposit is dried in steps 5.A and 5.B.

One edge of the electrodes is cut out in steps 6.A and 6.B. Advantageously, the edge related to the band is cut out in order to leave three edges coated with electrolyte on the edge. Since this electrolyte is a dielectric, it means that all that will appear in a later stacking step is anode contacts on one side of the cell and cathode contacts on the other side, so that parallel assemblies of battery elements can be made to form a higher capacity battery cell.

The stack is made in step 7 such that there is a succession of cut anode edges and cathode edges coated with electrolyte alternately on the two opposite sides of the stack. In step 8, this stack can be consolidated to obtain a good bond ("weld") between the two faces of the electrolyte film.

If the melting temperature of the anode and cathode films is significantly higher than the melting temperature of the electrolyte film, it is preferable to do the thermal consolidation of the anode and cathode films separately before stacking, and then to apply a thermal consolidation on the stack to consolidate the electrolyte film.

Once the stack is complete, the terminations (electrical contacts) are added at the level at which the cathode current and anode current collectors are exposed (not coated with insulating electrolyte). These contact zones may be on opposite sides of the stack to collect current, but they may also be on the same sides or on adjacent sides.

In one particular embodiment, the stack is made by winding two half-electrodes together on a mandrel to obtain a cylindrical-shaped cell. The anode connections then project from one side, while the cathode connections project from the other side.

Figure 2A:
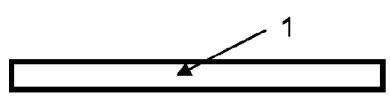
FIGS. 2a, 2a', 2b, 2b' show products obtained at different steps in a particular embodiment of the process according to the invention.
Figure 2A:
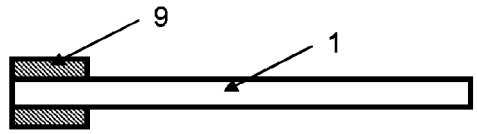
Figure 2B:
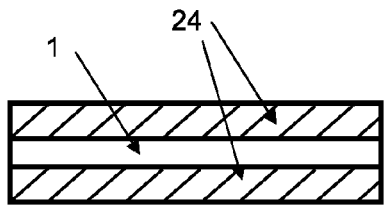
Figure 2B:
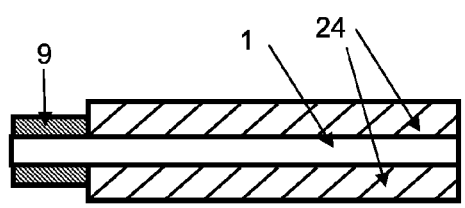

FIGS. 2a and 2b' show the different steps in the electrophoretic deposition of an electrode film according to the invention.

FIG. 2a shows procurement of a substrate, in this case a metal foil 1.

FIG. 2a' shows procurement of a substrate, in this case a metal foil 1, in this step partial protection of the surface of the substrate 1 is provided using an insulating stencil 9. This stencil may be a strippable polymer film.

FIGS. 2b and 2b' show the electrophoretic deposition of cathode nanoparticles 24 on the conducting parts of the substrate 1. In FIG. 2b, the deposition is made over the entire surface and on both faces of the substrate 1, while in FIG. 2b', part of the substrate is protected by the insulating stencil 9.

The product obtained by the process according to FIGS. 2a to 2b' corresponds to the case in which the substrate is provided in the form of a band.

Figure 3A:
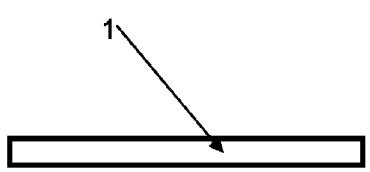
FIGS. 3a, 3a', 3b, 3b' show products obtained at different steps in a particular embodiment of the process according to the invention.
Figure 3A:
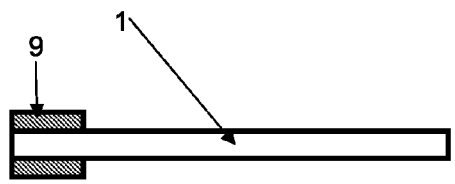
Figure 3B:
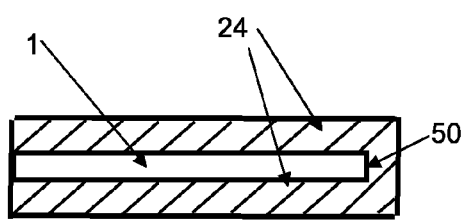
Figure 3B:
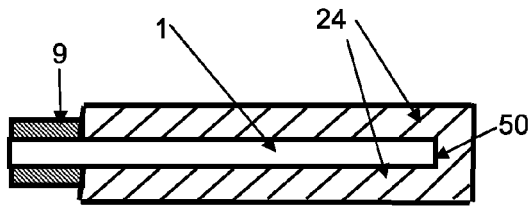

FIGS. 3a to 3b' show products identical to those in FIGS. 2a to 2b', except that the cathode film also covers one edge of the substrate.

For each of the embodiments in FIGS. 2 to 3, the foil of the metal substrate can be replaced by a metalized polymer film, the film being "strippable", in other words it can be dissolved in an appropriate solution or it can be peeled off.

Figure 4A:
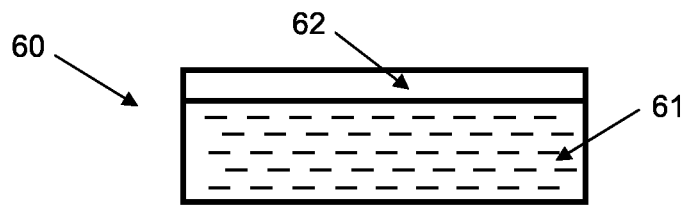
FIGS. 4a, 4b, 4c, 4d show products obtained at different steps in another particular embodiment of the process according to the invention in which the substrate on which the electrodes are deposited is a metalized polymer band.
Figure 4B:
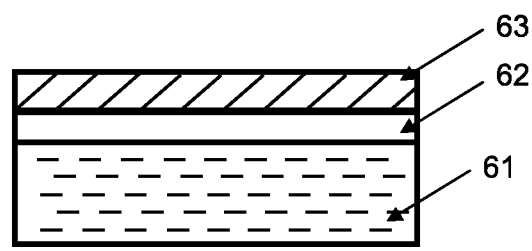

FIG. 4a shows procurement of a substrate 60, in this case in the form of a "strippable" polymer film 61 coated with a metal film 62, FIG. 4b shows the electrophoretic deposition of nanoparticles of the cathode 63 on conducting parts of the substrate 60.

Figure 4C:
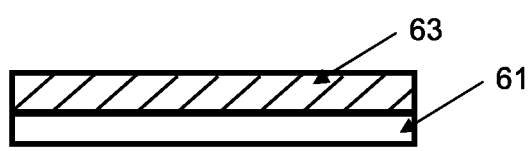

FIG. 4c shows stripping (or peel-off) of the polymer film.

Figure 4D:
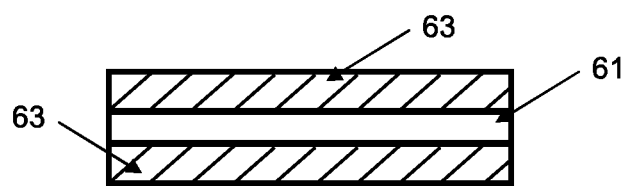

FIG. 4d shows the deposition of nanoparticles of the cathode 63 on the metal film 62 exposed in the step in FIG. 4c.

Figure 5A:
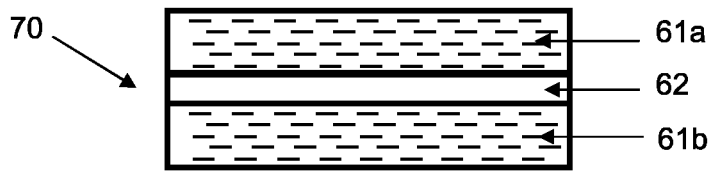
FIGS. 5a, 5b, 5c, 5d, 5e, 5f show products obtained at different steps in another particular embodiment of the process according to the invention in which the substrate on which the electrodes are deposited is composed of a metal foil covered with photosensitive polymer on its two faces, that can be used as a stencil.

FIG. 5a shows procurement of a substrate 70, in this case in the form of a metal film 62 coated on its two faces with a film of photosensitive polymer resin 61a, 61b.

Figure 5B:
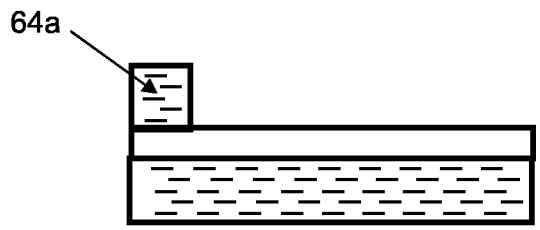

FIG. 5b shows the stencil made with the polymer 61a partially insolated and developed on one of the faces of the metal film 62, including production of a stencil 64a.

Figure 5C:
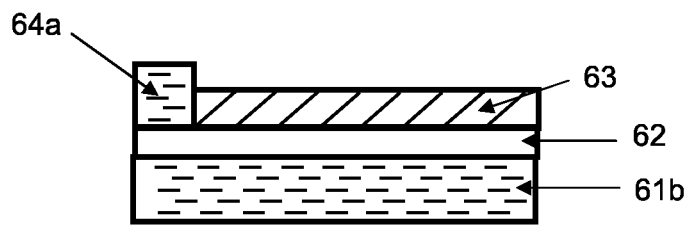

FIG. 5c shows the electrophoretic deposition of nanoparticles of the cathode 63 on conducting parts of the substrate 60 (part not coated with polymer or photosensitive resin).

Figure 5D:
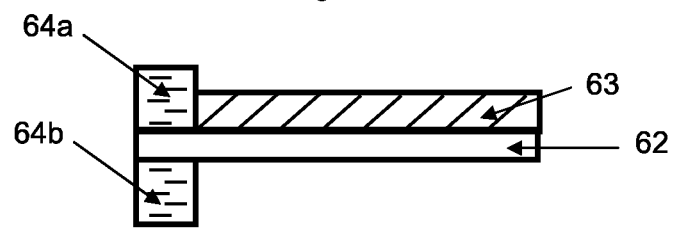

FIG. 5d shows the stencil made with the partially insolated polymer 61b developed on the other face of the metal film 62, including production of a stencil 64b.

Figure 5E:
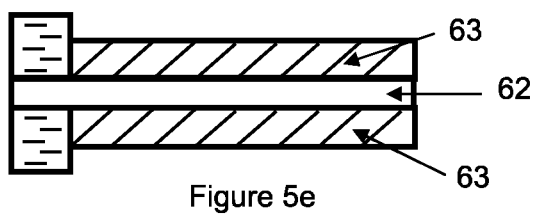

FIG. 5e shows the electrophoretic deposition of nanoparticles of the cathode 63 on conducting parts of the substrate 60 (part of the metal film 62 not coated with polymer or photosensitive resin, nor particles of the cathode 63).

Figure 5F:
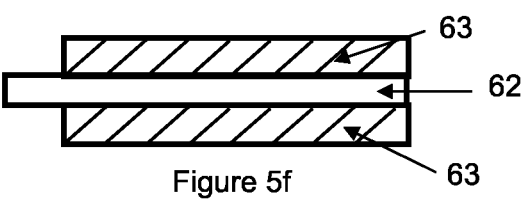

FIG. 5f shows stripping of the stencils 64a, 64b.

FIG. 6a shows procurement of a substrate, in this case in the form of an insulating plate 65 coated partially with metal films 68a, 68b corresponding to step d) in the main embodiment of the invention.

FIG. 6b shows electrophoretic deposition of nanoparticles of the cathode 63 on the metal part of the substrate 68a.

FIG. 6c shows the deposition of an electrolyte film 66 on the metal part of the substrate 68a coated with nanoparticles of the cathode 63.

FIG. 6d shows a sectional view of the battery after deposition of the anode thin film.

FIG. 10 shows the compact deposition of non-homogeneous sized nanoparticles 2, 17. Such a stack can be obtained directly by co-deposition of a mix of different sizes of nanoparticles or by successive depositions of different sizes of particles.

FIG. 12a shows the lithium diffusion path in a compact stack of particles impregnated with electrolyte. There is a surface contact zone 76 between the particles and the electrolyte contained in the pores. The diffusion path is only slightly resistive. There is also a point contact zone 77 between particles. Lithium diffusion on this point contact is limited.

FIG. 12b shows the development of the interface between the particles during consolidation. The diffusion path 78 can be achieved in the solid-state phase without the use of a liquid electrolyte in the pores.

FIG. 12c shows the structure obtained after consolidation of a composite deposit containing a "meltable" phase 79.

FIG. 12d diagrammatically shows the influence of consolidation on the type of porosity. This point can justify how the porosity of our batteries is less than 30%. At this level, pores are closed and can no longer be impregnated with electrolyte.

The performances (Wh/l, Wh/kg) of a thin film battery are better when the porosity is low.

Electrophoresis makes it possible to deposit films with compositions that are difficult or even impossible to obtain by a vacuum process; for example, polymers can be added into a mineral phase, or spinel ($LiMn_2O_4$) or olivine ($LiMPO_4$ where M=Fe, Co, Mn, Ni . . . ) type compounds can be deposited that are difficult to achieve by vacuum deposition.

Electrodes that can be obtained using the process according to the invention are different from known electrodes in several structural ways. The electrode is preferably all-solid-state, and its composition can be a composition that cannot be obtained by a vacuum deposition. The porosity of the anode and/or cathode films expressed by the ratio of the difference between the theoretical density of the films and the real density/theoretical density of the films, is low and can be less than 10% or even 5%, while known processes give a porosity that is usually higher than 20%. The grain size can be much lower than in batteries with thin films deposited by inks because the film deposited by electrophoresis is denser, even before consolidation.

In one particular embodiment, the electrode is composed solely of inorganic materials that contain neither lithium salts nor impregnated ionic liquids, thus avoiding corrosion problems on current collectors that can then both be composed of aluminium which is less expensive than copper or silver. It is often impossible to use aluminium in batteries according to the state of the art, or the use of aluminium is limited to the cathode, either because their fabrication requires excessively high temperatures compared with the melting point of aluminium, or because an aluminium connector could be corroded by lithium salts contained in the electrolytes and by the extreme voltages applied to collectors in the batteries. The fact that a single material is used for the collectors in a particular battery facilitates recycling.

The invention has many advantages. The process for fabrication of anode and cathode films by electrophoresis is simple, fast and inexpensive.

Furthermore, in advantageous embodiments of the invention, the electrode film does not contain any organic materials or lithium salts. In this case, the process according to the invention does not have to be used in a dry atmosphere, unlike processes according to the state of art making use of lithium or metallic lithium salts that are very sensitive to humidity. The lack of corrosive lithium salts extends the life of the battery, reduces the risk of an internal short circuit and also increases its resistance to temperature; consequently, batteries according to the invention can be wave-soldered, unlike known lithium ion thin-film batteries. Thus, batteries according to the invention are safer.

EXAMPLES

The process according to the invention can be used according to the examples presented below.

Example 1

Cathode Film

1—Preparation of the SP+ Colloidal Suspension

A $LiMn_2O_4$ powder composed of clusters of nanoparticles is synthesized to obtain the SP+ suspension of P+ particles for the cathode material. This is done using Pechini's method described in the article "*Synthesis and Electrochemical Studies of Spinel Phase $LiMn_2O_4$ Cathode Materials Prepared by the Pechini Process*", W. Liu, G. C. Farrington, F. Chaput, B. Dunn, J. Electrochem. Soc., vol.

143, No. 3, 1996. After the calcination step at 600° C., the powder contains clusters with a size of between 50 nm and 100 nm.

This powder is then put into suspension in ethanol at a concentration of 20 g/l.

The SP+ suspension is added into the bowl of a ball grinder previously filled with 0.1 mm diameter ceramic balls. Grinding for 2 hours in the presence of polyacrylic acid that acts as a complexing agent results in a colloidal solution with particles with size ($D_{50}$) equal to 30 nm. The zeta potential of the suspension is equal to about 65 mV.

2—Deposition of the Cathode Film

The $LiMn_2O_4$ particles contained in the suspension are then deposited on a substrate composed of a 100 μm thick copper sheet. The deposition is made by applying a voltage of 100 V between the substrate and a counter electrode, both immersed in the colloidal suspension, until a 4 μm thick deposit is obtained. This deposit is then compacted at a pressure of 500 MPa, dried for 1 hour at 90° C. before being consolidated by a 500° C. heat treatment for 1 hour. The porosity of the deposit thus obtained is less than 10%.

Example 2

Suspension of Cathode Particles and Deposition of a Cathode

Nanometric powders of $LiMn_{1.5}Ni_{0.4}Cr_{0.1}O_4$ were synthesized as described in example 5a below. These nanopowders were ground and dispersed in alcohol to obtain a 20 g/l suspension of $LiMn_{1.5}Ni_{0.4}Cr_{0.1}O_4$. Grinding-dispersion was continued until the size of particles in suspension was 30 nm. This suspension was then diluted in a ketone-based solvent to obtain a 5 g/l suspension. The deposition conditions were 70 V/cm, which gave a deposit about 1 μm thick after only a few seconds of anaphoresis.

Example 3

Anode Film

1—Preparation of the SP– Colloidal Suspension

Initially, a $Li_4Ti_5O_{12}$ powder composed of nanometric sized particle clusters is synthesized using the process described in the article "*Phase-pure nanocrystalline $Li_4Ti_5O_{12}$ for a lithium-ion battery*" by M. Kalbac et al., J Solid State Electrochem (2003) 8: 2-6. The synthesis is done by mixing a solution of LiOEt at 0.9M and titanium butoxide (IV) in ethanol, under argon. The mix is made with the stoichiometric ratio of Li/Ti=4:5. The solution obtained is then hydrolyzed with an aqueous solution at 4% of polyethylene glycol. The mix is then mixed for 11 hours before being evaporated at 40° C. to obtain a viscous paste. An $Li_4Ti_5O_{12}$ powder is obtained after calcination at 500° C.

This powder is then put into suspension in ethanol at a concentration equal to 20 g/l. The suspension is added into the bowl of a ball grinder previously filled with 0.1 mm diameter ceramic balls. Grinding for 3 hours in the presence of a few millilitres of polyacrylic acid that acts as a complexing agent can give a colloidal solution with particles with size ($D_{50}$) equal to about 8 nm. The zeta potential of the suspension is equal to 60 mV.

2—Deposition of the Anode Film

The $Li_4Ti_5O_{12}$ particles contained in the suspension are then deposited on a substrate composed of a 100 μm thick copper sheet. The deposition is made by applying a voltage of 200 V between the substrate and a counter electrode, both immersed in the colloidal suspension, until an 8 μm thick deposit is obtained. This deposit is then compacted at a pressure of 500 MPa, dried for 1 hour at 90° C. before being consolidated by heat treatment at 450° C. for 2 hours. The porosity of the deposit thus obtained is less than 10%.

Example 4

Anode Film

1—Preparation of the SP– Colloidal Suspension $Li_4Ti_5O_{12}$ nanoparticles were purchased from Aldrich, and then ground in ethyl alcohol at a concentration of 10 g/l. After this grinding-dispersion step, the suspension was ultrasonically irradiated and then allowed to settle. We drew off only the float of the suspension after settlement in order to be sure of obtaining a monodispersed colloidal suspension of nanoparticles with no clusters larger than 100 nm.

A suspension was thus obtained, without any added stabilizer. We observed that the stability of nanocolloids depended largely on the particle size and their concentration in the suspension. When the particle size is close to about ten nanometers, particles can be stable in suspensions without any added stabilizers. The high specific area of these particles and their low mass are such that interactions result in making the system behave like a real gas that can condense resulting in a colloidal crystal. Electrophoretic depositions of these nanoparticles result in condensation of this so-called colloidal crystal phase on the surface of the substrate.

2—Deposition of the Anode Film

In the following example, the $Li_4Ti_5O_{12}$ electrode was deposited as a thin film by electrophoresis of nanoparticles on an electro-polished aluminium foil.

The deposition conditions used were 10V/cm, which gave a compact deposition about 0.5 μm thick after only thirty seconds of anaphoresis.

The deposition was then annealed at 500° C. for 1 hour and then pressed at 50 MPa.

A cyclic voltammetry curve was then plotted on this electrode at 0.1 V/sec in order to validate its insertion properties with regard to lithium ions. FIG. 13a shows an illustration of the curve thus obtained.

Example 5

Synthesis of Nanoparticles that can be Used as Anode and Cathode Materials a) $LiMn_{1.5}Ni_{0.4}Cr_{0.1}O_4$ $Li_2CO_3$ powder is dissolved in a mix of citric acid and ethylene glycol heated to 70° C. by adding small portions of powder. A release of $CO_2$ is observed for each added portion. The mix temperature is increased to 90° C., and stoichiometric quantities of $Mn(NO_3)_2.4H_2O$, $Ni(NO_3)_2.6H_2O$ and $Cr(NO_3)_2.9H_2O$ are added to this final solution and the temperature of the mix is then increased to 140° C. until a hard bubbled mass is obtained. This mass is then placed in the drying oven at 250° C. until a powder is obtained. The powder obtained is then calcinated at 800° C. for 6 h. The powder obtained can be used to prepare cathode films in Li-ion type batteries.

b) $LiMnPO_4$

Stoichiometric quantities of an $Li_3PO_4$ powder and an $MnSO_4.4H_2O$ powder are ground in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

c) LiFePO$_4$

Stoichiometric quantities of an Li$_3$PO$_4$ powder and an FeSO$_4$.7H$_2$O powder are ground in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

d) Li$_{2.9}$PO$_{3.3}$N$_{0.36}$/Li$_{2.9}$PO$_{3.3}$N$_{0.46}$ (LIPON)

A nanometric Li$_3$PO$_4$ powder that has not received any high temperature heat treatment is placed in an alumina scoop placed in a tubular furnace. The powder is then heat treated at 650° C. for 2 h under an ammonia atmosphere. The powder thus obtained can be used to prepare electrolyte films in Li-ion type batteries.

The invention claimed is:

1. A process for fabrication of an electrode film for an all-solid-state battery, the process comprising:
   providing a conducting substrate;
   depositing via electrophoretic deposition, an electrode film on said conducting substrate, the electrode film being composed of a suspension containing nanoparticles of electrode materials without organic binders, the nanoparticles having an average particle size of less than less than 100 nm;
   drying the deposited electrode film; and
   thermally consolidating the dried electrode film by sintering at a temperature that does not exceed a predetermined threshold of a melting temperature of one the electrode materials having a lowest melting temperature from among the electrode materials.

2. The process of claim 1, wherein the predetermined threshold is 0.7 times the melting temperature of one of the electrode materials having a lowest melting temperature from among the electrode materials.

3. The process of claim 1, wherein the predetermined threshold is 0.5 times the melting temperature of one of the electrode materials having a lowest melting temperature from among the electrode materials.

4. The process of claim 1, wherein the predetermined threshold is 0.3 times the melting temperature of one of the electrode materials having a lowest melting temperature from among the electrode materials.

5. The process of claim 1, further comprising mechanically compacting the dried electrode film, one of before, or during, or after thermally consolidating the dried electrode film.

6. The process of claim 5, wherein at least one of thermally consolidating the dried electrode film and mechanically compacting the dried electrode film is done under a vacuum or an inert atmosphere.

7. The process of claim 1, wherein mechanically compacting the dried electrode film is done by application of a compression pressure between one of:
   20 and 100 MPa; and
   40 and 60 MPa.

8. The process of claim 1, wherein the electrophoretic deposition is made by anaphoresis.

9. The process of claim 1, wherein the thickness of the electrode film is one of:
   less than 20 μm;
   less than 10 μm; and
   less than 5 μm.

10. The process of claim 1, wherein the suspensions does not contain any stabilizers.

11. A process for fabrication of an all-solid-state battery, comprising:
   forming an electrode by:
      depositing an electrode film without organic binders via electrophoretic deposition of nanoparticles of an anode material and a cathode material on a conducting substrate, wherein the nanoparticles have an average particle size of less than or equal to 30 nm, and the thickness of the electrode film is less than 5 μm; and
      thermally consolidating the electrode film by sintering at a temperature that does not exceed a predetermined threshold of a lowest melting temperature between the anode material and the cathode material.

12. The process of claim 11, wherein the predetermined threshold is 0.7 times the lowest melting temperature between the anode material and the cathode material.

13. The process of claim 11, wherein the predetermined threshold is 0.5 times the lowest melting temperature between the anode material and the cathode material.

14. The process of claim 11, wherein the predetermined threshold is 0.3 times the lowest melting temperature between the anode material and the cathode material.

15. The process of claim 11, wherein a porosity of the electrode film is less than 10%.

16. The process of claim 11, further comprising, before thermally consolidating the electrode film, mechanically compacting the electrode film.

17. A process for fabrication of an electrode of an all-solid-state battery, comprising:
   forming an electrode film without organic binders by electrophoretic deposition of nanoparticles of an anode material and a cathode material on a conducting substrate, wherein the nanoparticles have an average particle size of less than or equal to 30 nm, and the thickness of the electrode film is less than 5 μm;
   drying the deposited electrode film; and
   thermally consolidating the dried electrode film by sintering at a temperature that does not exceed a predetermined threshold of a lowest melting temperature between the anode material and the cathode material.

18. The process of claim 17, wherein the predetermined threshold is one of 0.7, 0.5, and 0.3 times the lowest melting temperature between the anode material and the cathode material.

19. The process of claim 17, wherein a porosity of the electrode film is less than 10%.

* * * * *